(12) United States Patent
Loggia et al.

(10) Patent No.: US 10,287,790 B2
(45) Date of Patent: May 14, 2019

(54) COMPOSTING WATER HEATER AND METHOD OF HEATING WATER COMPOST

(71) Applicant: MÉDIA K-PLUS INC./K-PLUS MEDIA INC., Mont-Royal (CA)

(72) Inventors: Rosario Loggia, Saint-Léonard (CA); Claudio Cardinale, Montréal (CA); Alfi Cardinale, Montréal-Nord (CA)

(73) Assignee: MÉDIA K-PLUS INC./K-PLUS MEDIA INC., Mont-Royal (CA)

( * ) Notice: Subject to any disclaimer, the term of this patent is extended or adjusted under 35 U.S.C. 154(b) by 0 days.

(21) Appl. No.: 15/521,074

(22) PCT Filed: Oct. 26, 2015

(86) PCT No.: PCT/CA2015/051085
§ 371 (c)(1),
(2) Date: Apr. 21, 2017

(87) PCT Pub. No.: WO2016/061701
PCT Pub. Date: Apr. 28, 2016

(65) Prior Publication Data
US 2017/0356208 A1    Dec. 14, 2017

Related U.S. Application Data

(60) Provisional application No. 62/068,092, filed on Oct. 24, 2014.

(51) Int. Cl.
*E04H 4/12*    (2006.01)
*G05D 23/19*   (2006.01)
(Continued)

(52) U.S. Cl.
CPC ......... *E04H 4/129* (2013.01); *C05F 17/0063* (2013.01); *C05F 17/0081* (2013.01);
(Continued)

(58) Field of Classification Search
CPC .................................................... E04H 4/129
(Continued)

(56) References Cited

U.S. PATENT DOCUMENTS

| | | |
|---|---|---|
| 3,568,222 A | 3/1971 | Gantzert |
| 3,797,569 A | 3/1974 | Meder et al. |

(Continued)

FOREIGN PATENT DOCUMENTS

| | | |
|---|---|---|
| CA | 1215280 | 12/1986 |
| CA | 2328680 | 6/2002 |

(Continued)

OTHER PUBLICATIONS

English Abstract of CH664253(A5), "Riding school by products utilisation—using stable manure and riding track soil for fertiliser and heat recovery", published on Feb. 29, 1988.

(Continued)

*Primary Examiner* — Lori Baker
(74) *Attorney, Agent, or Firm* — Bereskin & Parr LLP/S.E.N.C.R.L., s.r.l.

(57) ABSTRACT

An apparatus for controlling water temperature includes a housing defining a composting chamber for receiving compost and a conduit disposed within the housing for providing flow of water. The conduit at least partially receives heat generated by the compost and may include a first subconduit extending substantially about an axis of the housing, a second subconduit extending substantially about the axis of the housing and being spaced apart from the first subconduit and a plurality of elongated subconduits extending between the first subconduit and the second subconduit and providing fluid communication therebetween. The housing may have at least one translucent portion for permitting flow of light waves therethrough. The apparatus may have a mechanism for mixing the compost.

20 Claims, 10 Drawing Sheets

(51) Int. Cl.

| | |
|---|---|
| F24H 1/00 | (2006.01) |
| C05F 17/02 | (2006.01) |
| F28D 1/04 | (2006.01) |
| F28D 1/053 | (2006.01) |
| F28D 1/02 | (2006.01) |
| C05F 17/00 | (2006.01) |
| F24V 99/00 | (2018.01) |
| F28F 9/26 | (2006.01) |

(52) U.S. Cl.
CPC ...... *C05F 17/0205* (2013.01); *C05F 17/0264* (2013.01); *C05F 17/0276* (2013.01); *F24H 1/0081* (2013.01); *F24V 99/00* (2018.05); *F28D 1/0213* (2013.01); *F28D 1/0426* (2013.01); *F28D 1/05316* (2013.01); *G05D 23/19* (2013.01); *F24D 2200/28* (2013.01); *F28F 9/262* (2013.01); *Y02P 20/145* (2015.11); *Y02W 30/43* (2015.05)

(58) Field of Classification Search
USPC .................................................. 4/488–513
See application file for complete search history.

(56) References Cited

U.S. PATENT DOCUMENTS

| | | | |
|---|---|---|---|
| 4,032,996 | A | 7/1977 | Sargent et al. |
| 4,271,539 | A | 6/1981 | Roberts |
| 4,285,075 | A | 8/1981 | Nelson |
| 4,343,907 | A | 8/1982 | Graefe |
| 4,423,526 | A | 1/1984 | Izzi, Sr. |
| 4,886,302 | A | 12/1989 | Forbes |
| 4,940,113 | A | 7/1990 | L'Heureux |
| 5,144,940 | A | 9/1992 | Fiarkoski, Sr. |
| 5,185,890 | A | 2/1993 | Dismore et al. |
| 5,208,923 | A | 5/1993 | Stiver |
| 5,309,579 | A | 5/1994 | Nelson |
| 5,608,922 | A | 3/1997 | Lewis |
| 6,065,160 | A | 5/2000 | Winn |
| 6,128,947 | A | 10/2000 | Anderson, Sr. |
| 6,221,656 | B1 | 4/2001 | Smith |
| 6,518,057 | B2 | 2/2003 | Morrison |
| 6,660,518 | B1 | 12/2003 | Maekawa |
| 6,789,275 | B2 | 9/2004 | Spells, Sr. et al. |
| 7,069,603 | B2 | 7/2006 | Flushing |
| 7,135,332 | B2 | 11/2006 | Ouellette |
| 7,458,109 | B1 | 12/2008 | Kreisel |
| 7,584,970 | B2 | 9/2009 | Ponce |
| 7,744,671 | B1 | 6/2010 | Ouellette |
| 8,671,470 | B2 | 3/2014 | Miller et al. |
| 2001/0023505 | A1 | 9/2001 | Atkins |
| 2002/0067006 | A1 | 6/2002 | Etcheverry |
| 2004/0058435 | A1 | 3/2004 | Ueda et al. |
| 2009/0158512 | A1 | 6/2009 | Stickler et al. |
| 2011/0056006 | A1 | 3/2011 | Colligan |
| 2011/0131715 | A1 | 6/2011 | Culwell |
| 2013/0219603 | A1 | 8/2013 | Wendorff |

FOREIGN PATENT DOCUMENTS

| | | |
|---|---|---|
| CA | 2644573 | 4/2009 |
| CA | 2715122 | 8/2009 |
| GB | 2062196 | 5/1981 |

OTHER PUBLICATIONS

English Abstract of CN2484364(Y), "Water closet mounting seal ring", published on Apr. 3, 2002.
English Abstract of CN2642871(Y), "Sealing gasket for closet", published on Sep. 22, 2004.
English Abstract of CN201024520(Y), "Flush toilet bottom rubber sealing gasket", published on Feb. 20, 2008.
English Abstract of DE102008017380(A1), "Heat exchanger in the form of double-walled tube for recovering waste heat from sewage useful in sewers, bathroom, kitchen and/or swimming pool, comprises an internal tube, which is made of thermal conductive material, and an external tube", published on Mar. 12, 2009.
English Abstract of JP2005083324(A), "Compost Fermentation Heat Power Generating Method and Device", publishes on Mar. 31, 2005.
English Abstract of JP2006111479(A), "Organic Waste Treatment System", published on Apr. 27, 2006.
English Abstract of JPH04154(A), "Putrefaction Heat Boiler Apparatus", published on Jan. 6, 1992.
English Abstract of JPH05330967(A), "Kitchen Refuse Treating Container", published on Dec. 14, 1993.
English Abstract of JPS5780139(A), "Water Heating Apparatus Utilizing Heat of Fermentation", published on May 19, 1982.
English Abstract of JPS6020051(A), "Heating Device Due to Heat Developed at Growing, Breeding and the Like Utilizing Microorganisms", published on Feb. 1, 1985.
English Abstract of JPS6042549(A), "Using Method of Fermentation Heat for Heating Water", published on Mar. 6, 1985.
English Abstract of JPS56113944(A), "Water Heater Utilizing Heat Generated by Ferment Bacilli", published on Sep. 8, 1981.
English Abstract of JPS59229130(A), "Utilizing Method of Fermentation Heat and Device Therefor", published on Dec. 22, 1984.
English Abstract of JPS62280546(A), "Hot Water Generating Device Utilizing Fermentation Heat", published on Dec. 5, 1987.
English Abstract of KR20080056696(A), "No title available", published on Jun. 23, 2008.
English Abstract of KR20090106248(A), "Fuel Saved Heating System", published on Oct. 8, 2009.
Jean Pain Composting, [online], [retrieved on Sep. 26, 2017]. Retrieved from the Internet <URL:http://www.daenvis.org/technology/Jeanpan.htm>.
Hackaday, "Composting to Create Hot Water", [online], [retrieved on Sep. 26, 2017]. Retrieved from the Internet <URL:http://www.hackaday.com/2010/05/23/composting-to-create-hot-water/.
Jointer West, "Using Compost Piles for Thermo Power", published on Apr. 24, 2008.
From Appropedia, "Recycling agricultural wastes to produce hot water (original)" [online], [retrieved on Sep. 26, 2017]. Retrieved from the Internet <URL:http://www.appropedia.org/Recycling_agricultural_wastes_to_produce_hot_water_(original).
From Appropedia, "Composting greenhouse provides hot water (original)" [online], [retrieved on Sep. 26, 2017]. Retrieved from the Internet <URL:http://www.appropedia.org/Composting_greenhouse_provides_hot_water_(original).

COMPOSTING WATER HEATER AND METHOD OF HEATING WATER COMPOST

CROSS REFERENCE TO RELATED APPLICATIONS

The present application is a 35 USC 371 national stage entry of PCT/CA2015/051085 filed on Oct. 26, 2015 and which claims priority on U.S. 62/068,092 filed on Oct. 24, 2014. These documents are hereby incorporated by reference in their entirety.

FIELD OF THE DISCLOSURE

The present disclosure relates to the field of methods and apparatuses controlling water temperature. In particular, the present disclosure relates to apparatuses and methods for controlling the water temperature of a pool.

BACKGROUND OF THE DISCLOSURE

There are many issues with the pool heaters that are available on today's market. In general, they are very costly to buy and to maintain. On average a pool heater will cost approximately 2500$ to 5000 $ or more to purchase and approximately 800$ for installation costs. Also, they can cost about 600$ to about 1200$ in energy costs (gas, propane, electricity) per year to operate in addition to maintenance costs. This energy consumption contributes to the green house gases that damage the atmosphere.

Another factor is the constant noise that most heaters produce. Indeed, most heaters generate a perpetual unpleasant buzz that can be annoying when enjoying the pool. They are also quite annoying for the neighbors as well.

Also, if the heater is defective, a technician is usually required in order to repair the problem, which can be costly. Other costs are generated when changing heating systems in order to go from fresh water to salt water. Also, traditional pool heaters need to be covered or stored during winter months in order to avoid damage to mechanical parts. However, even when well maintained, the average pool heater only lasts about 7 to 10 years.

Some cost effective pool heaters have been introduced on the market, but their main downfall remains that they are not efficient enough for client's needs. Indeed, since they rely on the sun to generate heat and have a relatively low energy conversion rate, they often fail to provide sufficient power in order to heat a normal sized pool. Other types of pool heaters have also been introduced on the market. Indeed, pool heaters relying on electricity or fossil fuels although effective are sadly not cost efficient.

SUMMARY OF THE DISCLOSURE

It would thus be highly desirable to be provided with an apparatus that would at least partially solve one of the problems previously mentioned or that would be an alternative to the existing technologies.

According to one aspect there is provided an apparatus for controlling water temperature, the apparatus comprising: a housing defining a composting chamber for receiving compost; a conduit disposed within the housing for providing flow of water, the conduit at least partially receiving heat generated by the compost, the conduit comprising: a first subconduit extending substantially about an axis of the housing; a second subconduit extending substantially about the axis of the housing and being spaced apart from the first subconduit; and a plurality of elongated subconduits extending between the first subconduit and the second subconduit and providing fluid communication therebetween.

According to another aspect, there is provided an apparatus for controlling temperature of water, the apparatus comprising: a housing; interior walls disposed within the housing and defining an inner chamber for receiving compost; and a conduit for providing flow of water, the conduit at least partially receiving heat generated by the compost through the interior walls; and wherein the conduit at least partially contacts an outer surface of the interior walls to receive heat therefrom.

According to another aspect, there is provided an apparatus for controlling water temperature, the apparatus comprising: a housing defining a composting chamber for receiving compost, the housing having at least one translucent portion for permitting flow of light waves therethough, the flow of the light waves heating the composting chamber; and a conduit disposed within the housing for providing flow of water, the conduit at least partially receiving heat generated by the compost and at least partially receiving heat from the flow of light waves through the at least one translucent portion.

According to another aspect, therein provided an apparatus for controlling water temperature, the apparatus comprising: a housing defining a composting chamber for receiving compost and having a lid member for selectively covering an opening of the composting chamber; a mechanism for mixing the compost, a mixing portion of the mechanism being positioned within the composting chamber and a handling portion of the mechanism being located outside the housing, the handling portion being operable to be manipulated while the lid member is covering the composting chamber to cause mixing of the compost within the composting chamber by the mechanism; and a conduit disposed within the housing for providing flow of water, the conduit at least partially receiving heat generated by the compost.

BRIEF DESCRIPTION OF THE DRAWINGS

In the appended drawings which represent various examples.

DETAILED DESCRIPTION OF THE DISCLOSURE

Figure 1:
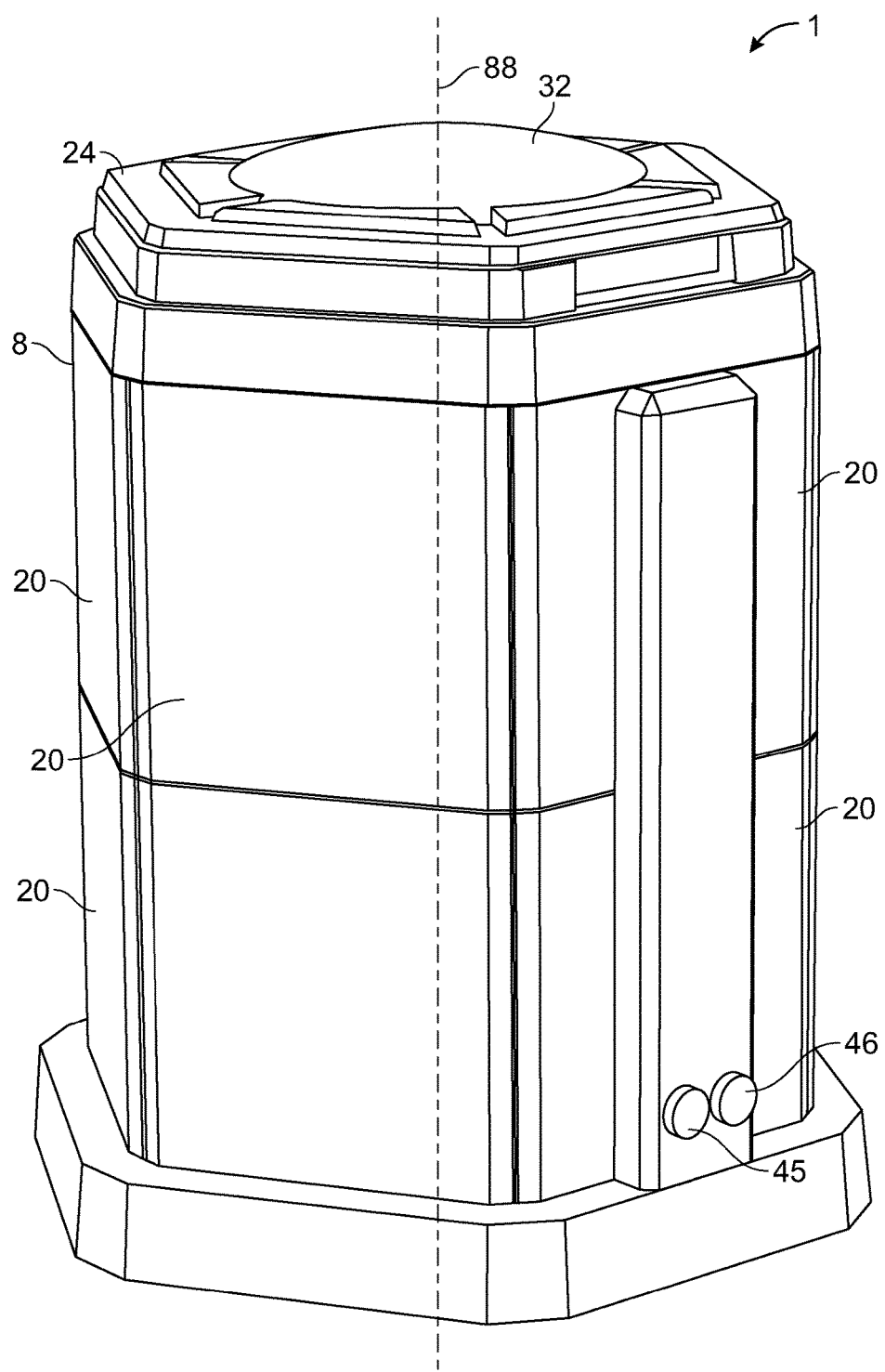
FIG. 1 illustrates a perspective view of a temperature control apparatus according to one exemplary embodiment.

The following examples are presented in a non-limitative manner.

For example, according to apparatuses disclosed herein, the second subconduit extends substantially about the axis of the housing and is spaced apart in an axial direction from the first subconduit and the plurality of elongated subconduits extends axially between the first subconduit and the second subconduit and provides fluid communication therebetween.

For example, according to apparatuses disclosed herein, the first subconduit and the second subconduit are spaced apart in an axial direction from a bottom of the housing.

For example, according to apparatuses disclosed herein, the housing comprises at least one translucent portion for permitting flow of light waves therethrough, the flow of the light waves heating the inside of the housing.

For example, according to apparatuses disclosed herein, the at least one translucent portion permits flow of short length (UV) waves therethrough.

For example, according to apparatuses disclosed herein, the translucent portion provides a greenhouse effect within the inside of the housing.

For example, according to apparatuses disclosed herein, the housing comprises at least one light absorbent portion for absorbing heat from light incident thereon and for at least partially transmitting the absorbed heat through the housing to at least partially heat the composting chamber.

For example, according to apparatuses disclosed herein, the apparatus further comprises a water inlet and a water outlet, the water flowing from the inlet to the outlet via the conduit.

For example, according to apparatuses disclosed herein, the apparatus further comprises a lid member for selectively covering an opening of the composting chamber.

For example, according to apparatuses disclosed herein, the lid member is dome-shaped and translucent for providing a greenhouse effect within the composting chamber.

For example, according to apparatuses disclosed herein, the apparatus further comprises a mechanism for mixing the compost received within the composting chamber, a mixing portion of the mechanism being located within the composting chamber and a handling portion of the mechanism being located outside the composting chamber.

For example, according to apparatuses disclosed herein, the handling portion can be manipulated while the lid member is covering the composting chamber to cause mixing of the compost within the composting chamber by the mechanism.

For example, according to apparatuses disclosed herein, the conduit is formed of a material having high heat conductivity for at least partially transmitting heat absorbed from the compost to the water flowing through the conduit.

For example, according to apparatuses disclosed herein, the conduit is formed of a light absorbent material for absorbing heat from light incident thereon and for at least partially transmitting the absorbed heat to the water flowing through the conduit For example, according to apparatuses disclosed herein, at least one of the elongated subconduits has a radial width thereof greater than an angular thickness thereof.

For example, according to apparatuses disclosed herein, the housing comprises at least one slot in communication with an exterior of the composting chamber, the at least one slot being operable to drain liquid from the composting chamber to the exterior.

For example, according to apparatuses disclosed herein, the at least one slot restricts passage of the compost therethrough.

For example, according to apparatuses disclosed herein, the apparatus further comprises at least one hollow column extending into the composting chamber, the hollow column having at least one open bottom end and a plurality of air pores in communication with an exterior of the composting chamber through the at least one open bottom end.

For example, according to apparatuses disclosed herein, the hollow column further comprises at least one spacer member extending radially outwardly from a surface of the column, a bottom surface of the spacer member having at least one opening defining at least one of the air pores, the at least one opening of the spacer member permitting airflow therethrough and restricting entry of the compost.

For example, according to apparatuses disclosed herein, wherein a top end of the hollow column is open.

For example, according to apparatuses disclosed herein, the conduit surrounds the outer surface of the interior walls.

For example, according to apparatuses disclosed herein, the interior walls separate the conduit from the compost received within the inner chamber.

For example, according to apparatuses disclosed herein, an outer surface of the interior walls is spaced apart from the inner surface of the housing to define an interior space for at least partially insulating the conduit from the housing.

For example, according to apparatuses disclosed herein, the conduit is a coil rolled around the outer surface of the interior walls.

For example, according to apparatuses disclosed herein, the conduit comprises a plurality of independent subconduits and the inlet comprises a fluid splitter for splitting the water among the plurality of independent subconduits.

For example, according to apparatuses disclosed herein, the conduit comprises: a first subconduit extending substantially about an axis of the housing; a second subconduit extending substantially about the axis of the housing and being spaced apart from the first subconduit; a plurality of elongated subconduits extending between the first subconduit and the second subconduit and providing fluid communication therebetween.

The term "pool" as used herein refers to a swimming pool, a hot tub, spa, swimming bath, wading pool or any water basin for similar purposes.

Referring now to FIG. 1, therein illustrated is a perspective view of a temperature control apparatus 1 according to one exemplary embodiment. The temperature control apparatus 1 comprises a housing 8 adapted to receive compost. The housing 8 can be of different sizes and shapes. The housing 8 comprises walls that define a composting chamber 16 for receiving the compost.

The compost can comprise various organic materials. For example, it can comprise common organic waste materials such as table wastes, lawn clipping, dried leaves, etc. It can also comprises various other ingredients such as sawdust, chicken manure and poultry wastes, brewery wastes, seaweed and kelp, tobacco stems and waste, wool clippings, sewerage sludge, straw, hay, cattails, weeds and discarded plants from the garden, cotton nolls and wastes, paper scraps etc.

The housing 8 further defines a chamber opening 24 through which the compost may enter to be received within the composting chamber 16. The housing 8 further includes a lid member 32 for selectively covering the chamber opening 24 of the composting chamber 16. For example, the lid member 32 may be useful for avoiding spillage of the enclosed compost, preventing water from contacting the compost or avoiding animals or insects from having access to the inside of the compositing chamber 16.

Figure 2:
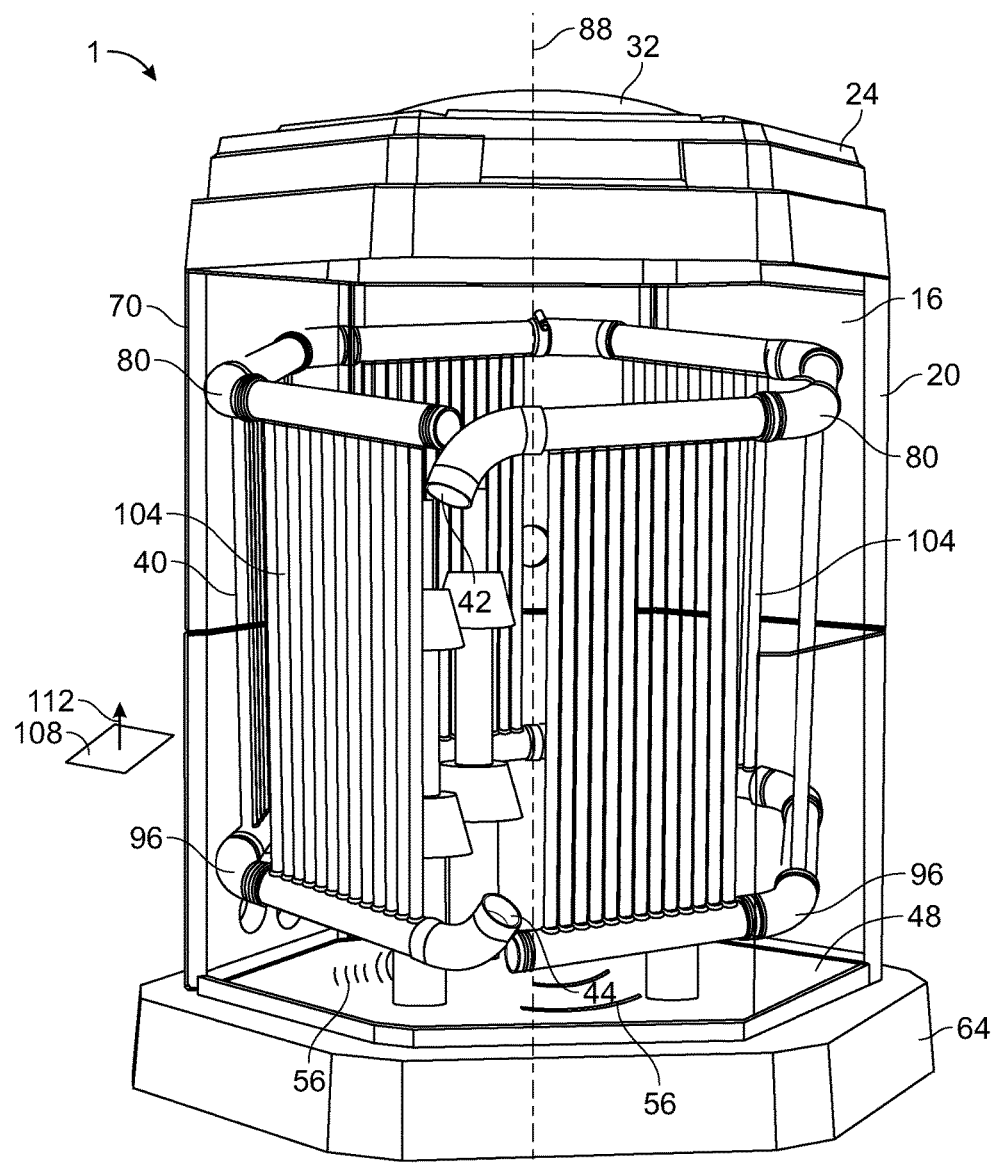
FIG. 2 illustrates a partial cut-away view of the temperature control apparatus according to one exemplary embodiment.

Referring now to FIG. 2, therein illustrated is a partial cut-away view of the temperature control apparatus 1 according to the exemplary embodiment illustrated in FIG. 1. A conduit 40 is disposed inside the housing 8. For example, the conduit 40 can be in the form of a coil as shown in FIG. 2. The conduit 40 is provided with an inlet 44 for receiving water from a pool and an outlet 42 for exiting water that flowed through the conduit 40. Water flowing from the inlet 44 to the outlet 42 through the conduit 40 is circulated through the composing chamber 16. It will be appreciated that in the example of FIG. 2, inlet 44 is located at a lower portion of the housing 8 and that the outlet 42 is located at an upper portion of the housing 8. Positioning the outlet 42 may promote heating of water flowing through the conduit due to heat having a tendency to rise upwards. However, it will be understood that according to other exemplary embodiments, the outlet 42 may be located in the lower portion of the housing 8 and the inlet 44 may be located at an upper portion of the housing 8.

Heat generated from fermentation of the compost received within the composting chamber 16 is at least partially transmitted to the conduit 40 and further to the water flowing through the conduit 40, thereby increasing the temperature of the flowing water. For example, the conduit 40 may be formed of a material having high heat conductivity for at least partially transmitting heat absorbed from the compost to the water flowing through the conduit, such as plastic, rubber, fiberglass, aluminum, or copper.

Continuing with FIG. 1, at least one portion of the housing 8 is translucent to permit light waves incident on the housing 8 to flow through the translucent portion of the housing 8 into the composting chamber 16. The flow of light through the translucent portion into the composting chamber has the effect of at least partially heating the composting chamber 16. Additionally or alternatively, the light flowing through the translucent portion may be incident on the conduit 40, which further heats up the conduit 40 and the water flowing through the conduit 40. The at least one translucent portion may permit at least the flow therethrough of short length waves, such as ultra-violet waves.

For example, the conduit 40 may be formed of a light absorbent material for absorbing heat from light incident thereon and for at least partially transmitting the absorbed heat to the water flowing through the conduit 40.

For example, the at least one translucent portion may further provide a greenhouse effect within the composting chamber 16. Light flowing through the translucent portion may be partially absorbed by the compost received in the composting chamber 16, the conduit 40 or both. Radiation or other types of waves being emitted from the compost or the conduit 40 are then trapped by the at least one translucent portion, thereby further contributing to increasing the amount of heat generated within the composting chamber 16.

For example, the at least one translucent portion may be a translucent window on an upstanding wall of the housing 8. For example, the at least one translucent portion may be formed of an insulating material for insulating the composting chamber 16 from an outer environment surrounding the housing 8.

According to one exemplary embodiment, almost the whole of the housing 8 may be formed of a translucent material so as to maximize the amount of light flowing into the composting chamber 16 and the heat generated therein. For example, upstanding walls 20 of the housing 8 are completely (or almost completely) translucent, while it is not required for the base of the housing 8 to be translucent because little light flows through the base of the housing 8. For example, and as illustrated, the upstanding walls 20 may be formed of a plurality of upstanding panels, which may each be a planar panel.

According to various exemplary embodiments, the upstanding walls 20 housing 8 may further include at least one heat absorbent portion for absorbing heat from light incident on the housing 8. The heat absorbent portion is further adapted to at least partially transmit the heat absorbed from the incident light through the housing 8 to at least partially heat the composting chamber 16.

According to various exemplary embodiments, the lid member 32 may be translucent for permitting light waves incident on the lid member 32 to flow through the lid member 32 into the composting chamber 16. The flow of light through the translucent lid member 32 may have the effect of heating the composting chamber 16. Additionally or alternatively, the light flowing through the translucent lid member 32 may be incident on the conduit 40, which further heats up the conduit 40 and the water flowing through the conduit 40. The at least one translucent lid member 32 may permit at least the flow therethrough of short length waves, such as ultra-violet waves.

For example, the translucent lid member 32 may further provide a greenhouse effect within the composting chamber 16. Light flowing through the translucent lid member 32 may be partially absorbed by the compost received in the composting chamber 16, the conduit 40 or both. Radiation or other types of waves being emitted from the compost or the conduit 40 are then trapped by the translucent lid member 32, thereby further contributing to increasing the amount of heat generated within the composting chamber.

According to one various exemplary embodiments, the lid member 32 may be dome-shaped and translucent for further increasing the greenhouse effect provided by the translucent lid member 32.

Referring back to FIG. 1, the temperature control apparatus 1 further includes a housing inlet 45 and a housing outlet 46. The housing inlet 15 is in fluid communication with the inlet 44 of the conduit 40 and pool water received through the housing inlet 45 flows to the inlet 44 and into the conduit 40. Similarly, housing outlet 46 is in fluid communication with the outlet 42 of the conduit 40 and pool water exiting the outlet 42 flows to the housing outlet 46 and further exits the housing 8 to return to the pool.

A base 48 of the housing 8 includes one or more drain slots 56. The drain slots 56 are sized to restrict passage therethrough of the compost received in the composting chamber 16 while also allowing flow therethrough of juices generated from fermentation of the compost. The temperature control apparatus 1 may further include a receptacle 64 disposed below the housing 8 for collecting juices flowing through the drain slots 56. The receptacle 64 may include an outlet 72 (e.g. second opening) for exiting juices collected within the receptacle 64.

Continuing with FIG. 2, according to various exemplary embodiments, the conduit 40 positioned within the composting chamber 16 is arranged to include a first subconduit 80. For example, the first subconduit 80 is positioned in an upper region of the composting chamber 16. The first subconduit 80 may extend about an axis 88 of the housing 8. For example, the first subconduit 80 may extend circumferentially to form a substantially annular channel about the axis 88. The conduit 40 further includes a second subconduit 96 extending about the axis 88 of the housing 8 and being spaced apart from the first subconduit 80. For example, and as illustrated, the first subconduit 80 is spaced apart in an axial direction from the second subconduit 96. For example, the second subconduit 96 is positioned in a lower region of the composting chamber 16. The second subconduit 96 may also extend circumferentially to form a substantially annular channel about the axis 88. The conduit 40 may further include a plurality of elongated subconduits 104 extending between the first subconduit 80 and the second subconduit 96 to provide fluid communication therebetween. For example, and as illustrated, the elongated subconduits 104 may extend axially between the first subconduit 80 and the second subconduit 96. For example, the first subconduit 80 is in direct fluid communication with one of the inlet 44 and the outlet 42 but is only in communication with the other of the inlet 44 and the outlet 42 via the plurality of elongated subconduits 104. Similarly the second subconduit 96 is in direct fluid communication with the other of the inlet 44 and the outlet 42, but is only in communication with the one of the first of the inlet 44 and the outlet 42 via the plurality of elongated subconduits 104.

For example, and as illustrated in FIG. 2, the first and second subconduits 80, 96 are positioned at an elevated position (i.e. spaced apart) from the bottom 108 of the housing 8.

For example, and as illustrated in FIG. 2, the first subconduit 80, the second subconduit 96 and elongated subconduits 104 are spaced apart from an inner surface of the upstanding walls of the housing 8. Spacing the conduit 40 apart from the walls of the housing 8 provides a buffer between the exterior and the conduit 40, thereby reducing heat flow (loss) from the conduit 40 to the exterior.

At least one of the plurality of the elongated subconduits 104 extends in a radial direction in relation to the axis 88 of the housing 8 to define a radial width of the elongated subconduit 104. Furthermore, the elongated subconduit 104 extends in an angular direction in relation to the axis 88 to define an angular thickness.

Figure 3:
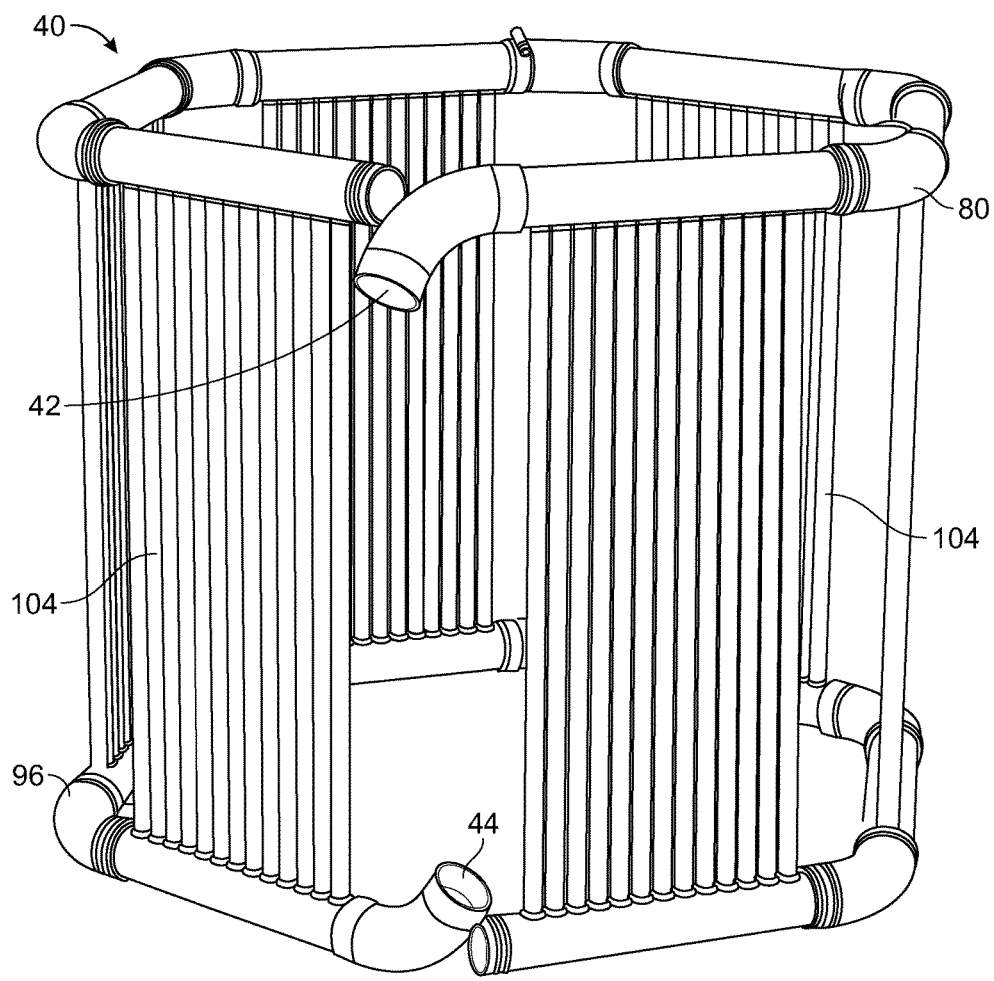
FIG. 3 illustrates a perspective view of the conduit according to one exemplary embodiment.
Figure 4:
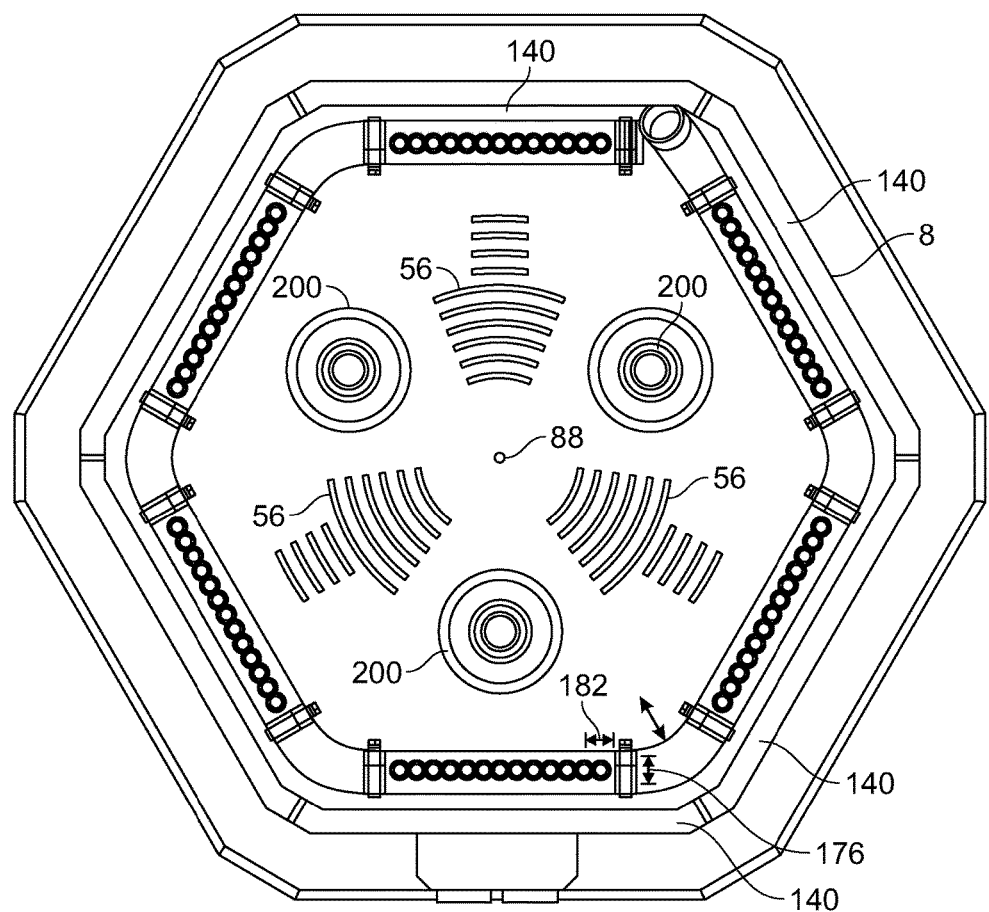
FIG. 4 illustrates a section view of the temperature control apparatus according to one exemplary embodiment.

Referring now to FIGS. 3 and 4 simultaneously, therein illustrated is a perspective view of the conduit 40 in isolation and a section view along the plane 108 defined by vector 112, respectively. For example, and as illustrated, each of the elongated subconduits 104 extending between the first subconduit 80 and the second subconduit 96 has a substantially circular cross-section. Furthermore, the cross-sectional area of each of the elongated subconduit 104 is smaller than the cross-sectional area of the first subconduit 80 or the second subconduit 96. It will be appreciated that passing a given volume of water through subconduits having a smaller cross-sectional area requires more subconduit surface area than the subconduit surface area required for passing the same given volume of water through subconduits having larger cross-sectional area. Accordingly, using elongated subconduit 104 having smaller cross-sectional areas increases the contact surface of the subconduits 104 with the compost disposed within the composting chamber 16, thereby improving heat transfer from the compost to the water flowing through the subconduits 104.

According to various exemplary embodiments, the radial width 176 of the elongated subconduit 104 in the radial direction 180 is greater than its angular thickness. Where a plurality of the elongated subconduits 104 each have a radial width 176 greater than an angular thickness 182, the plurality of elongated subconduits 104 resemble a plurality of fin-like members arranged circumferentially about the axis 88. It will be appreciated that the fin-like elongated subconduits 104 increases the surface area of elongated subconduits 104 that are exposed to the compost received within the composting chamber 16, thereby increasing the amount of heat transmitted from the compost to the water flowing through the elongated subconduits 104 and further increasing the rate at which the temperature of the water can be increased.

Figure 5:
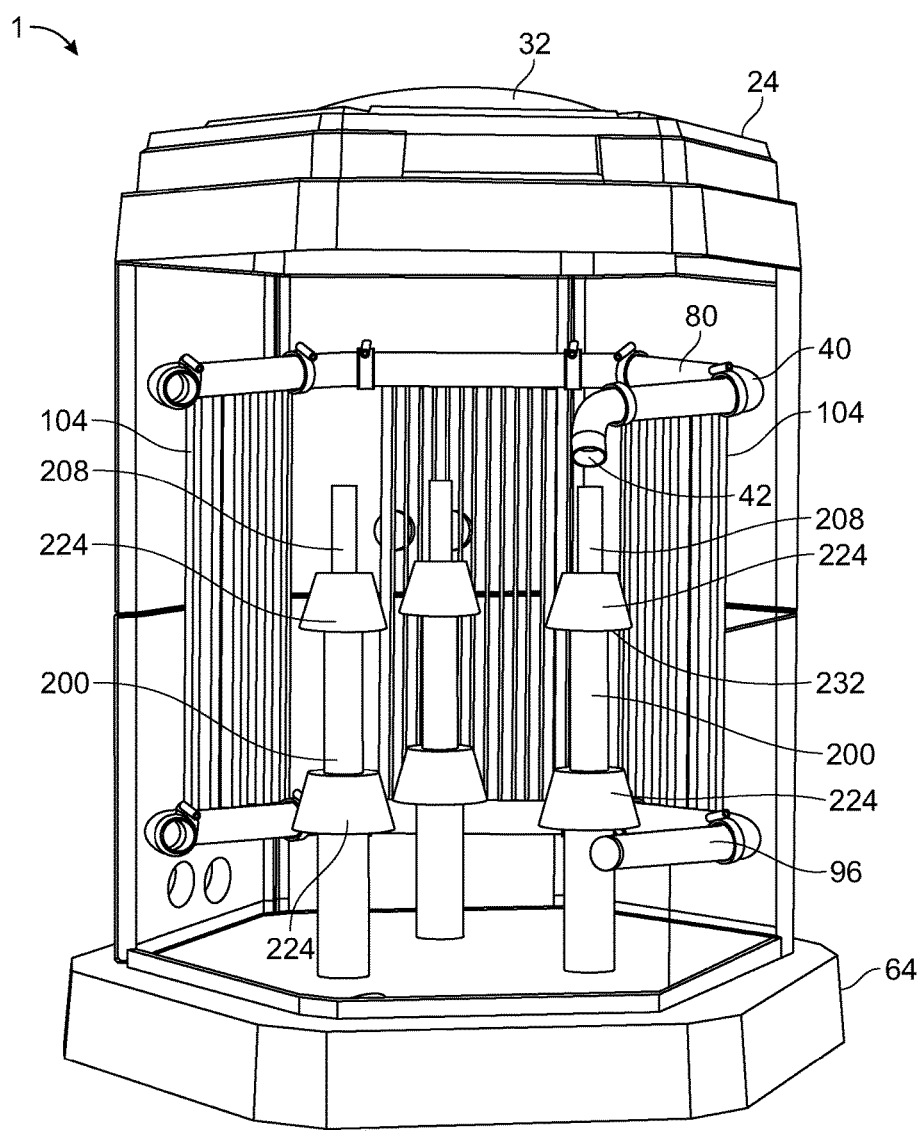
FIG. 5 illustrates a partial cut-away view of the temperature control apparatus according to one exemplary embodiment.
Figure 6:
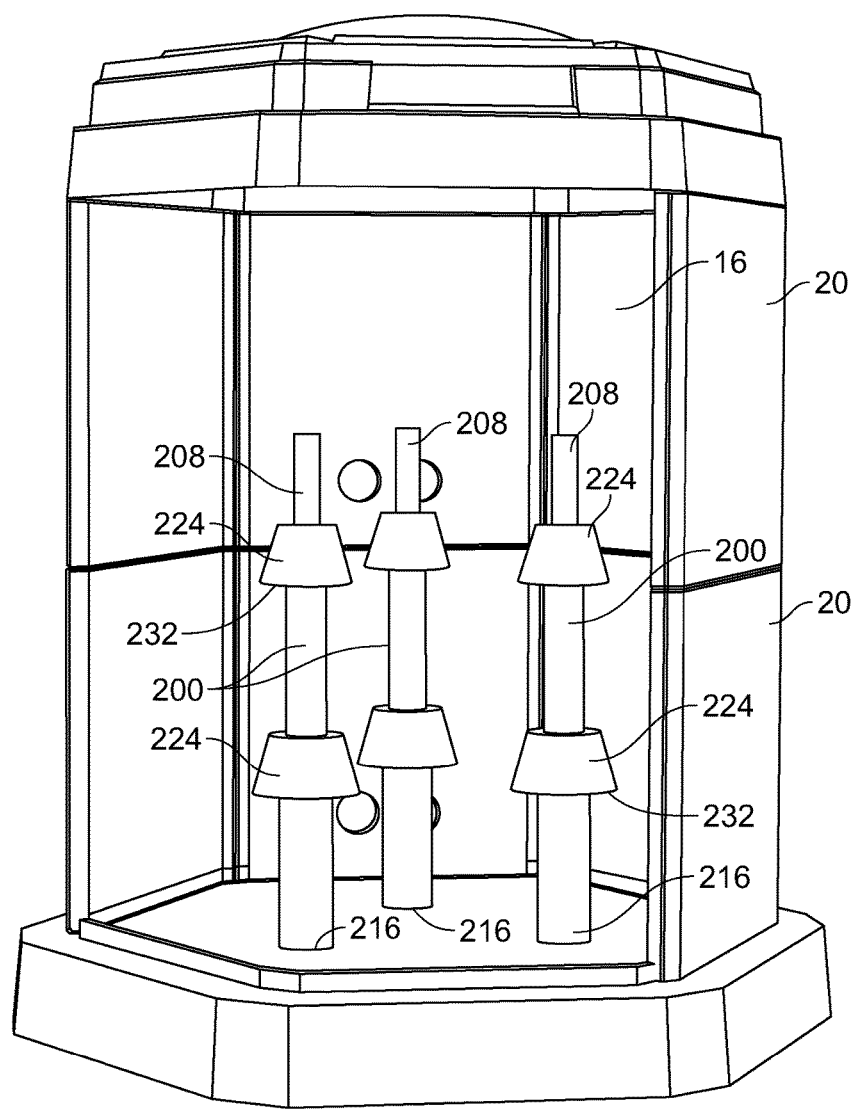
FIG. 6 illustrates a partial cut-away view of the temperature control apparatus according to one exemplary embodiment.

FIG. 5 illustrates a partial cut-away of the temperature control apparatus 1 according to various exemplary embodiments having panels 20 and a section of the conduit 40 being removed. FIG. 6 illustrates a partial cutaway having some panels 20 being removed and all of the conduit 40 being removed. For example, and as illustrated in FIGS. 5 and 6, the temperature control apparatus 1 includes at least one aeration duct 200 extending into the composting chamber 16. The aeration duct 200 includes a hollow column 208 having at least one open bottom end 216. The top of the hollow column 208 may also be open. The aeration duct 200 further includes a plurality of air pores along its length that are in fluid communication with the open end of the hollow center column 208. When the composting chamber 16 is filled with compost, the aeration duct 200 provides flow of air through its air pores into a body of the compost, thereby accelerating fermentation of the compost.

According to some exemplary embodiments, the aeration duct 200 further includes at least one spacer member 224. The at least one spacer member 224 extends radially outwardly from the column 208. The at least one spacer member 224 includes at least one of the air pores of the aeration duct 200. For example, a bottom surface 232 of the spacer member 224 includes an opening defining one of the air pores. The opening is further in communication with the hollow channel defined by the hollow column 208. Providing the air pore on the bottom surface 232 of the spacer member 224 restricts entry of compost material into the air pore while still allowing flow of air into the composting chamber 16.

Figure 7:
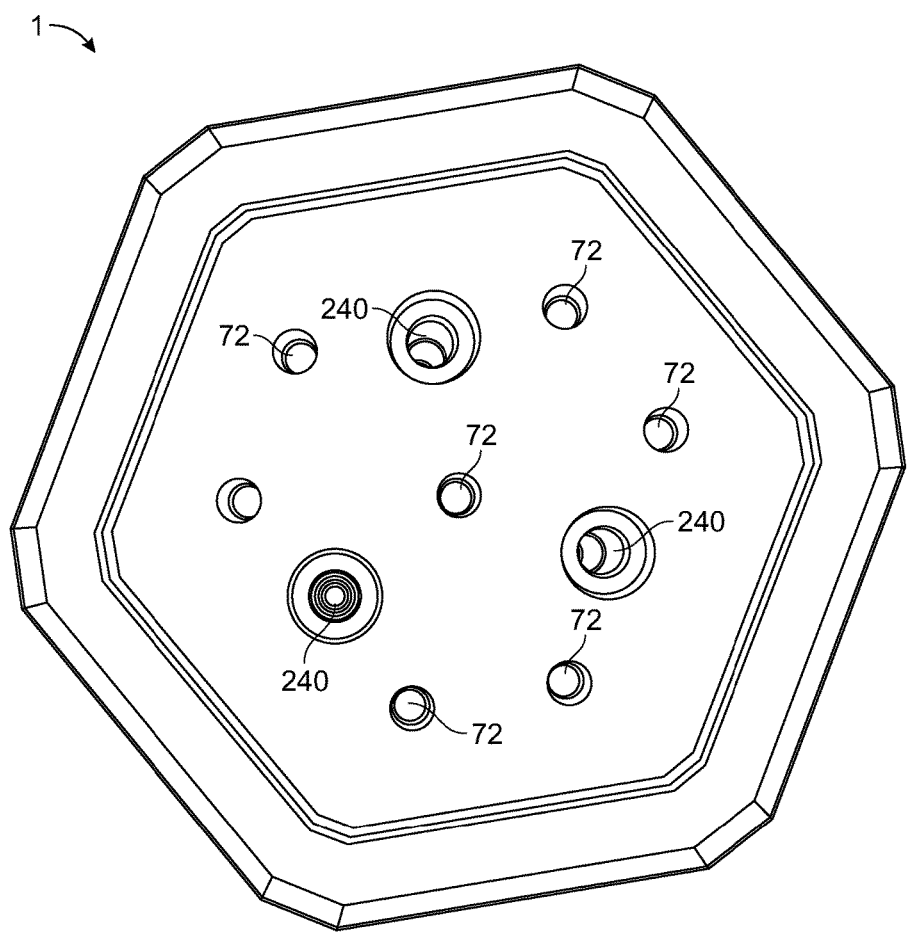
FIG. 7 illustrates a bottom view of the temperature control apparatus according to one exemplary embodiment.

Referring now to FIG. 7, therein illustrated is a bottom view of the temperature control apparatus 1. The bottom of the temperature control apparatus 1 includes a set of at least one first opening 240 in communication with the hollow channel of the hollow column 208. For example, and as illustrated, the bottom of the temperature control apparatus 1 includes three openings 240, each opening 240 being in communication with the hollow channel of one of the hollow columns 208. Air entering the first opening 240 can flow through the hollow channel and through the aeration pores to further contact the compost disposed within the composting chamber 16. The bottom of the temperature control apparatus 1 further includes a set of at least one second opening 72, each being in fluid communication with a drain slot 56. Juices flowing out of the composting chamber 16 can further exit the temperature control apparatus 1 through the second opening 72.

Figure 8:
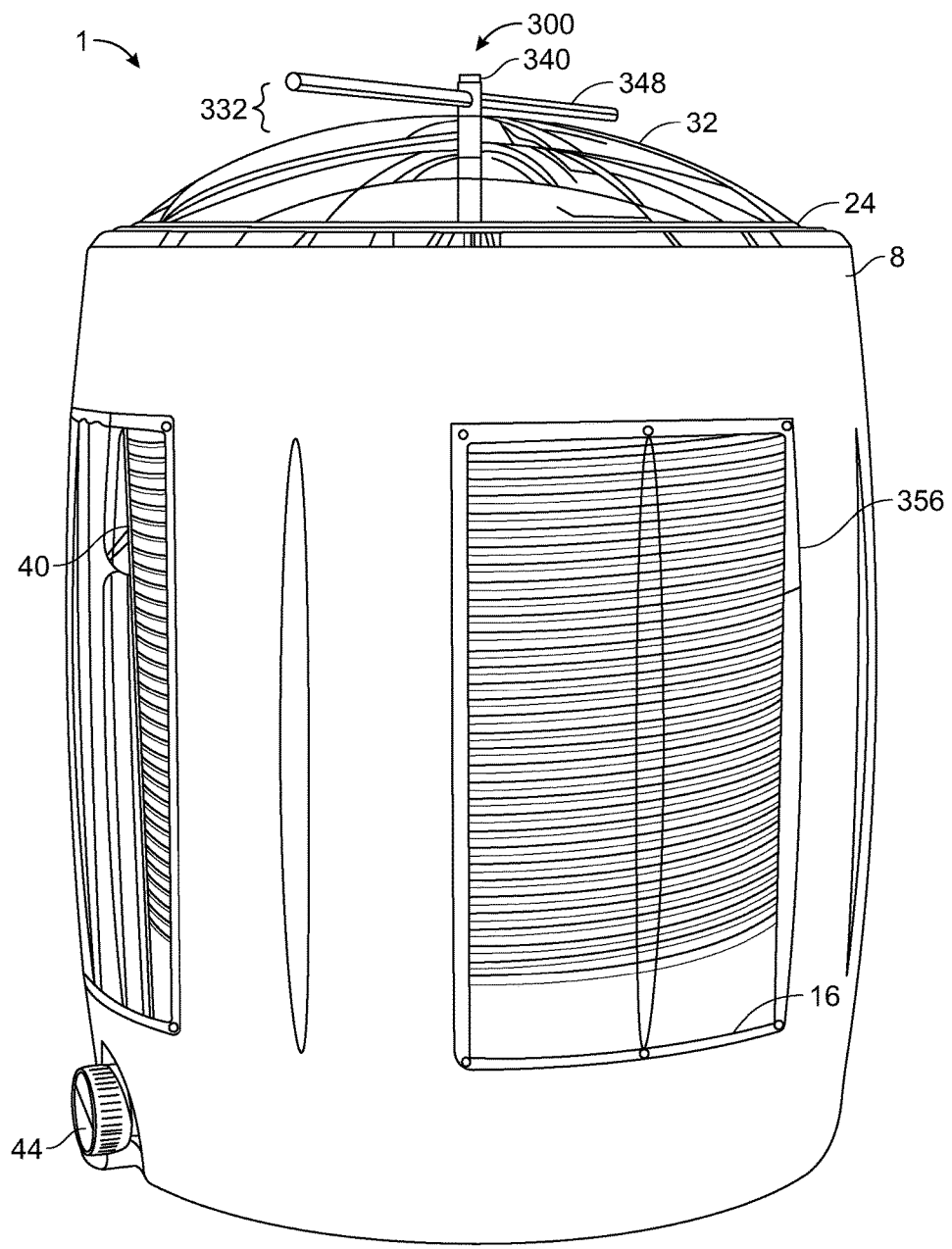
FIG. 8 illustrates a front elevation view of an exemplary alternative temperature control apparatus.

Referring now to FIG. 8, therein illustrated is a front elevation view of a temperature control apparatus 1 according to one exemplary variant. For example, and as illustrated in FIG. 8, the conduit 40 is a coiled pipe, which may be coiled circumferentially about the composting chamber 16.

For example, the conduit 40 may be supported against an inner surface of the housing 8. For example, the conduit 40 is coiled circumferentially about the composting chamber 16 by being adhered to an inner surface of housing 8.

For example, a conduit support can be provided. The conduit support can be disposed inside the housing 8. The conduit support can be of various shapes. In an embodiment, the conduit support can have a general cylindrical shape. The conduit support can be open on one or both sides, therefore allowing compost to enter into the conduit support. The conduit support can be made of a material having high heat conduction, which therefore absorbs and transfers thermal energy rapidly. For example, the conduit support can comprise brass or copper or any metal known as a thermal conductor. The conduit member can be made of a perforated material for allowing oxygenation of the compost. The conduit support adapted to support the conduit 40 which is in the form of a coiled pipe. For example, the conduit 40 is supported and coiled circumferentially about the composting chamber 16 by being wrapped around an outer surface of the conduit support.

For example, the coiled conduit 40 is wrapped at least once around a conduit support inside the composting chamber 16. Wrapping the conduit 40 more than once around the conduit support increases the surface of the conduit 40 that is in contact with the surrounding compost and the conduit support. Since both the compost and the conduit support are hot when being in use, the conduit support being heated by a heat transfer from the compost during fermentation, they will both play a role in controlling and/or heating the temperature of the water circulating through the conduit 40.

Figure 9:
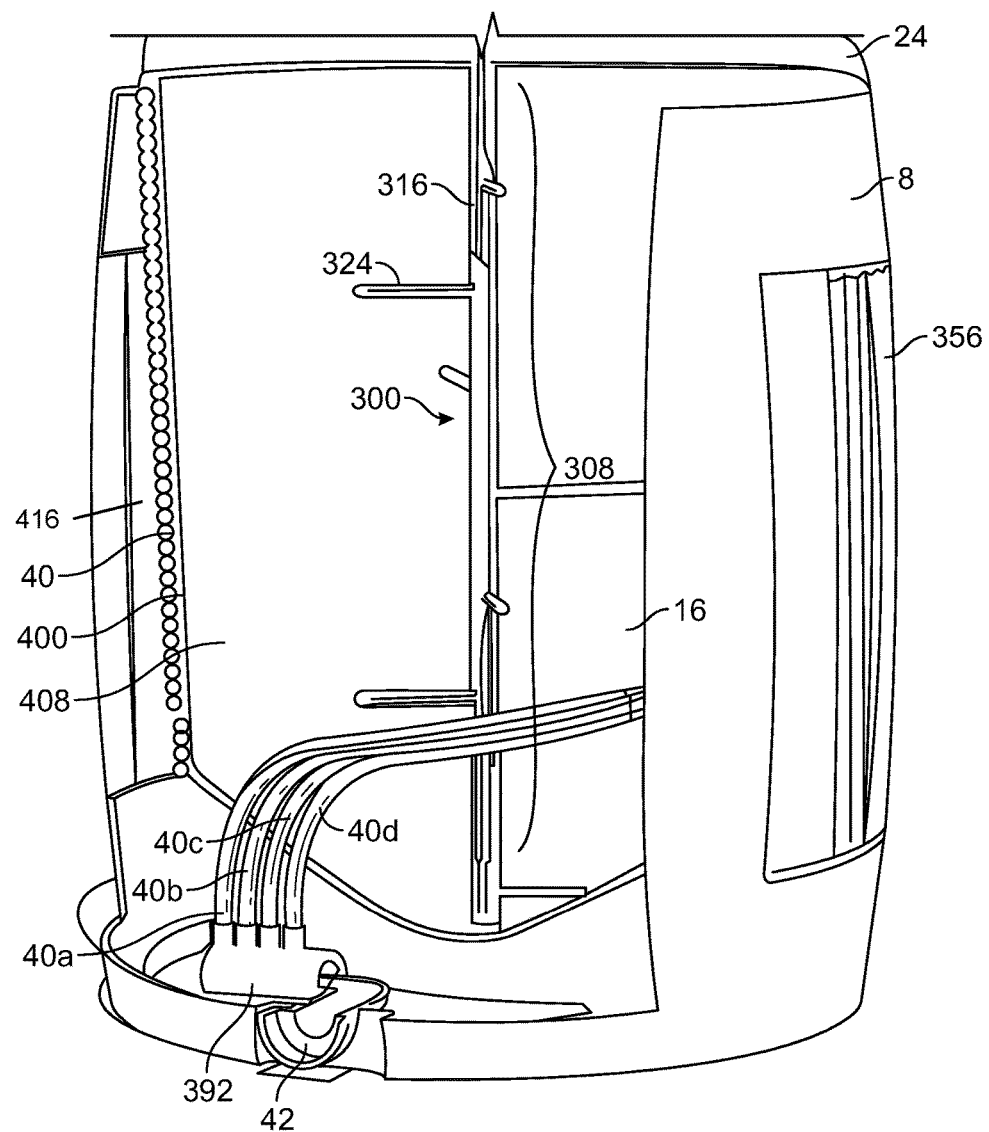
FIG. 9 illustrates a partial cut-away view of the exemplary alternative temperature control apparatus.

Referring now to FIG. 9, therein illustrated is a side elevation view of the temperature control apparatus 1 with a partial cut-away. According to various exemplary embodiments, the temperature control apparatus 1 includes a mechanism 300 for mixing the compost received within the composting chamber 16. The mixing mechanism 300 may be removable or permanently mounted to the recipient, and may be manually operated by a user or motorized. In the latter case, a timer may be provided so that the compost is automatically mixed at pre-selected time periods or intervals.

A mixing portion 308 of the mechanism 300 is located within the composting chamber 16. The mixing portion 308 corresponds to a portion of the mixing mechanism 300 that is operable for mixing the compost received within the composting chamber 16. For example, the mechanism 300 may include a spine portion 316 extending axially through the housing 8. The mixing portion 308 may have mixing members 324 extending transversely from the spine portion 316, whereby rotation of the spine portion 316 causes rotational movement of the mixing members 324 to mix the compost received in the composting chamber 16. Alternatively, the mixing portion 308 may be a type of corkscrew that mixes the compost when rotated.

The mixing mechanism 300 further includes a handling portion 332 being located outside the composting chamber 16. The handling portion 332 is connected with the mixing portion 308 so that manipulation of the handling portion 332 outside the composting chamber 16 can cause mixing of the compost inside the composting chamber 16 by the mixing portion 308. For example, rotation of the handling portion 332 causes rotation of the spine portion 316 and the mixing member 324 to mix the compost. For example, the handling portion 332 can be manipulated to cause mixing of the compost received in the composting chamber 16 by the mixing portion 308 while the lid member 32 is covering the composting chamber 16.

Referring back to FIG. 8, an end region 340 of the spine portion 316 may extend through the lid member 32 to be located outside the composting chamber 16. The handling members 348 may be further coupled to the end region 340 of the spine portion 316 to allow for manipulation of the handling portion 332. For example, one or more handles 348 may be coupled to the end region 340 of the spine portion 316 and oriented transversely to an axis of the spine portion 316. However, it will be appreciated that any other means may be coupled to end region 340 of the spine portion 316 to provide for manipulation of the handling portion 348 while also causing rotation of the mixing portion 308.

The temperature control apparatus 1 according to the examples of FIGS. 1 to 7 may also have the mixing mechanism 300 as described herein.

Continuing with FIGS. 8 and 9, the temperature control apparatus 1 is illustrated therein to include a translucent window 356 within the housing 8.

According to various exemplary embodiments, the inlet 44 of the conduit 40 includes a fluid splitter 392 for splitting the received water among a plurality of independent tubular subconduits. As illustrated in FIG. 9, the fluid splitter 400 splits the flow of water amongst a first tubular subconduit 40a, a second tubular subconduit 40b, a third tubular subconduit 40c and a fourth tubular subconduit 40d. It will be understood that the expression "independent" as used herein with respect to subconduits refers to portions of the subconduits that are isolated (i.e. not in fluid communication) except through another joining element (ex: the fluid splitter). It will be appreciated that by splitting the flow water among a plurality of independent subconduits, the amount of conduit tubing by surface area required to provide a given volume of water flow is greater than when using a single conduit tube to provide the same volume of water flow. Accordingly, the surface area of conduit tubing useful for receiving heat from compost in the composting chamber 16 is increased, which increases the rate at which the temperature of water can be increased.

Referring now to FIG. 9 only, according to various exemplary embodiments, the apparatus 1 further includes interior walls 400 disposed within the housing 8. The interior walls 400 define an inner chamber 408. According to such exemplary embodiments, the compost is received only within the inner chamber 408. Furthermore, the conduit 40 is positioned so that it receives heat generated by the compost through the interior walls 400.

For example, and as illustrated, the conduit 40 at least partially contacts an outer surface of the interior walls 400 to receive heat from the interior walls 400. For example, the conduit is coiled to surround the outer surface of the interior walls 200. By positioning the conduit 40 outside of the inner chamber 408, the conduit 40 is separated from the compost received within the inner chamber 408 by the interior walls 200. This prevents accumulation of compost within crevices formed by the conduit 40, thereby facilitating cleaning of the apparatus 1.

According to such exemplary embodiments, the lid member 32 may be operable to selectively cover an opening of the inner chamber 408.

According to such exemplary embodiments, the mixing portion 308 of the mixing mechanism 300 is positioned within the inner chamber 408 while the handling portion 332 is located outside the inner chamber 408. For example, the handling portion 332 can be manipulated while the lid member 32 is covering the inner chamber to cause rotation of the mixing portion 308 to mix the compost within the inner chamber 408.

For example, the outer surface of the interior walls is spaced apart from the inner surface of the housing to define an interior space 416. The interior space 416 may provide a partial insulating effect. For example, the interior space 416 at least partially insulates the conduit 40 from the housing 8. Where the housing 8 includes at least one translucent portion 356, the light waves flowing through the translucent portion 356 heats the interior space 416 and the conduit 40.

Figure 10:
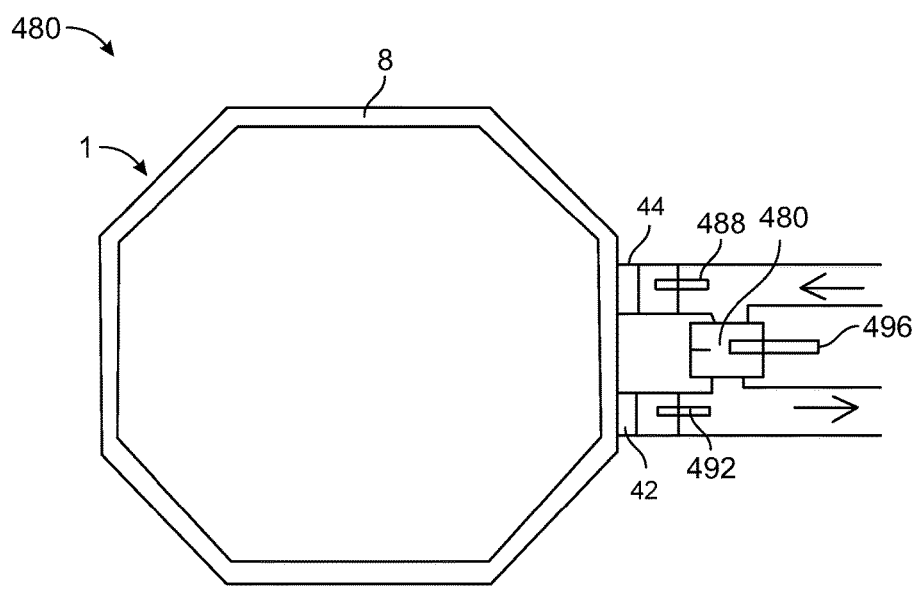
FIG. 10 illustrates a plan view of a temperature control system according to one exemplary embodiment.

Referring now to FIG. 10, therein illustrated is a plan view of a temperature control system 480 according to various exemplary embodiments. The temperature control apparatus 1 can comprise a valve control system for selectively controlling flow of water into the inlet 44 and out of the outlet 42. A first shut-off valve 488 is provided upstream of the inlet 44 and is operable to selectively permit or restrict flow of water from the pool through the inlet 44 into the conduit 40 of the apparatus 1. A second shut-off valve 492 is provided downstream of the outlet 42 and is operable to selectively permit or restrict flow of water from the conduit 40 through the outlet 42. The valve control system further includes a by-pass valve 496 upstream of the first shut-off valve 488 and downstream of the second shut-off valve 492. Controlling the by-pass valve 496 to a by-pass (open) position while controlling both the first shut-off valve 488 and the second shut-off valve 492 to closed position causes water from the pool to be diverted through the by-pass valve 496 and to circumvent the conduit 40 of the apparatus 1.

According to various exemplary embodiments, the temperature control system 480 may further include an automatic valve control system for automatically controlling the shut-off valves 488, 492 and the by-pass valve 496. For example, automatically controlling the valves 488, 492, 496 permits automatically controlling the water temperature. For example, automatically controlling the valves permits automatically maintained a desired or predetermined water temperature. For example, the desired temperature of the pool water can be of about 24° C. to about 35° C., about 24° C. to about 32° C., about 26° C. to about 32° C., about 26° C. to about 29° C., about 26° C. to about 27° C., about 28° C., or about 29° C.

The valve control system includes a controller, a temperature sensor, and electronically controlled shut-off and by-pass valves. The controller described herein may be implemented in hardware or software, or a combination of both. It may be implemented on a programmable processing device, such as a microprocessor or microcontroller, Central Processing Unit (CPU), Digital Signal Processor (DSP), Field Programmable Gate Array (FPGA), general purpose processor, and the like. In some embodiments, the programmable processing device can be coupled to program memory, which stores instructions used to program the programmable processing device to execute the controller. The program memory can include non-transitory storage media, both volatile and non-volatile, including but not limited to, random access memory (RAM), dynamic random access memory (DRAM), static random access memory (SRAM), read-only memory (ROM), programmable read-only memory (PROM), erasable programmable read-only memory (EPROM), electrically erasable programmable read-only memory (EEPROM), flash memory, magnetic media, and optical media.

The temperature sensor can sense or monitor the water temperature. For example, water temperature may be measured at any one of the inlet 44 of the conduit 40, within the conduit 40, at the outlet 42 of the conduit 40, or at any location within the pool of water for which temperature is to be controlled. For example sensing includes taking a measurement of the water temperature. Monitoring, or variants thereof, as used herein refers to repeatedly sensing the water temperature over time. For example, monitoring can be carried out in a substantially continuous manner. It will be understood that substantially continuous monitoring is the result of repeated sensing at short time intervals apart (periodically or non-periodically) such that a plurality of discrete measurements closely spaced in time are made. As a result, the monitoring may appear to be continuous to a human operator. Moreover, substantially continuous monitoring may appear to be in real-time.

The water temperature measured by the temperature sensor is received by the controller. The controller then controls the shut-off valves and the by-pass valves based on the measured water temperature. For example, the controller determines whether a predetermined threshold water temperature has been reached. When the water temperature has exceeded the predetermined temperature threshold, the controller sends one or more control signals to actuate the shut-off valves to their closed positions and the by-pass valve to its open position, thereby directing flow through the by-pass valve and restricting flow into the conduit 40. When the water temperature is below the predetermined temperature threshold, the controller sends one or more control signals to actuate the shut-off valves to their open positions and the by-pass valve to its closed position, thereby directing flow into the conduit 40.

The shut-off valves and the by-pass valves may be any type of valve that may be electronically controlled. For example, the shut-off valve and the by-pass valve may each be a solenoid valve.

The apparatuses and methods described in the present disclosure comprise several advantages compared to traditional pool heaters. Heat being provided by only composting, very low costs are necessary to operate the apparatuses and methods. The apparatuses and methods necessitate very simple components. Compost comes from organic materials derived from plant and/or animal matter, which are produced as wastes by every household on a regular basis. No other energy sources in addition to the existing elements of the pool are required to heat the pool water. Repairing should not be required and if so, it should be mainly maintenance or very simple repairing steps. Finally, no noise is associated with use of such methods and apparatuses.

The present disclosure has been described with regard to specific examples. The description was intended to help the understanding of the disclosure, rather than to limit its scope. It will be apparent to one skilled in the art that various modifications can be made to the disclosure without departing from the scope of the disclosure as described herein, and such modifications are intended to be covered by the present document.

The invention claimed is:

1. An apparatus for heating water, the apparatus comprising:
   a housing defining a composting chamber for receiving compost; and
   a conduit disposed within the housing for providing flow of water, the conduit at least partially receiving heat generated by the compost, the conduit comprising:
   a first subconduit extending substantially about an axis of the housing;
   a second subconduit extending substantially about the axis of the housing and being spaced apart from the first subconduit; and
   a plurality of elongated subconduits extending between the first subconduit and the second subconduit and providing fluid communication therebetween.

2. The apparatus of claim 1, wherein the second subconduit extends substantially about the axis of the housing and is spaced apart in an axial direction from the first subconduit and the plurality of elongated subconduits extends axially between the first subconduit and the second subconduit and provides fluid communication therebetween.

3. The apparatus of claim 1, wherein the first subconduit and the second subconduit are spaced apart in an axial direction from a bottom of the housing.

4. The apparatus of claim 1, wherein the housing comprises at least one translucent portion for permitting flow of light waves therethrough, the flow of the light waves heating the inside of the housing.

5. The apparatus of claim 4, wherein the at least one translucent portion permits flow of short length (UV) waves therethrough.

6. The apparatus of claim 1, wherein the housing comprises at least one light absorbent portion for absorbing heat from light incident thereon and for at least partially transmitting the absorbed heat through the housing to at least partially heat the composting chamber.

7. The apparatus of claim 1, further comprising a lid member for selectively covering an opening of the composting chamber.

8. The apparatus of claim 7, wherein the lid member is dome-shaped and translucent for providing a greenhouse effect within the composting chamber.

9. The apparatus of claim 1, further comprising a mechanism for mixing the compost received within the composting chamber, a mixing portion of the mechanism being located within the composting chamber and a handling portion of the mechanism being located outside the composting chamber.

10. The apparatus of claim 9, wherein the handling portion can be manipulated while the lid member is covering the composting chamber to cause mixing of the compost within the composting chamber by the mechanism.

11. The apparatus of claim 1, wherein the conduit is formed of a material having high heat conductivity for at least partially transmitting heat absorbed from the compost to the water flowing through the conduit.

12. The apparatus of claim 1, wherein the conduit is formed of a light absorbent material for absorbing heat from light incident thereon and for at least partially transmitting the absorbed heat to the water flowing through the conduit.

13. The apparatus of claim 1, wherein at least one of the elongated subconduits has a radial width thereof greater than an angular thickness thereof.

14. An apparatus for heating water, the apparatus comprising:
   a housing defining a composting chamber for receiving compost, the housing having at least one translucent portion for permitting flow of light waves therethough, the flow of the light waves heating the composting chamber; and
   a conduit disposed within the housing for providing flow of water, the conduit at least partially receiving heat generated by the compost and at least partially receiving heat from the flow of light waves through the at least one translucent portion.

15. The apparatus of claim 14, wherein the at least one translucent portion permits flow of short length (UV) waves therethrough.

16. The apparatus of claim 14, wherein the housing comprises at least one light absorbent portion for absorbing heat from light incident thereon and for at least partially transmitting the absorbed heat through the housing to at least partially heat the composting chamber.

17. The apparatus of claim 14, wherein the conduit is coiled circumferentially about the composting chamber.

18. The apparatus of claim 14, wherein the conduit comprises a plurality of independent subconduits;
   and wherein the inlet comprises a fluid splitter for splitting the water among the plurality of independent subconduits.

19. The apparatus of claim 14, further comprising a lid member for selectively covering an opening of the composting chamber.

20. The apparatus of claim 19, wherein the lid member is dome-shaped and translucent for providing a greenhouse effect within the composting chamber.

* * * * *